United States Patent
Bennett

(10) Patent No.: US 9,926,749 B2
(45) Date of Patent: Mar. 27, 2018

(54) EXPANDABLE METAL-TO-METAL SEAL CONNECTION

(71) Applicant: ENVENTURE GLOBAL TECHNOLOGY, LLC, Houston, TX (US)

(72) Inventor: Frederick Cornell Bennett, Houston, TX (US)

(73) Assignee: Enventure Global Technology Inc., Houston, TX (US)

(*) Notice: Subject to any disclaimer, the term of this patent is extended or adjusted under 35 U.S.C. 154(b) by 49 days.

(21) Appl. No.: 14/669,642

(22) Filed: Mar. 26, 2015

(65) Prior Publication Data

US 2015/0285009 A1     Oct. 8, 2015

Related U.S. Application Data

(60) Provisional application No. 61/975,363, filed on Apr. 4, 2014.

(51) Int. Cl.
*E21B 17/042* (2006.01)
*F16L 15/00* (2006.01)
*F16L 15/06* (2006.01)

(52) U.S. Cl.
CPC .......... *E21B 17/042* (2013.01); *F16L 15/004* (2013.01); *F16L 15/06* (2013.01); *Y10T 29/49881* (2015.01)

(58) Field of Classification Search
CPC ......... E21B 17/042; F16L 15/00; F16L 15/04; F16L 15/006; F16L 15/009; F16L 15/004; F16L 15/06; Y10T 29/49881
USPC ................................................. 285/333, 334
See application file for complete search history.

(56) References Cited

U.S. PATENT DOCUMENTS

| | | |
|---|---|---|
| 6,409,175 B1 | 6/2002 | Evans et al. |
| 6,550,821 B2 | 4/2003 | DeLange et al. |
| 6,554,287 B1 | 4/2003 | Sivley, IV et al. |
| 6,604,763 B1 | 8/2003 | Cook et al. |
| 6,607,220 B2 | 8/2003 | Sivley, IV |
| 6,712,401 B2 | 3/2004 | Coulon et al. |
| 6,968,628 B1 | 11/2005 | Garrick |
| 6,971,685 B2 | 12/2005 | Hashem |
| 7,086,669 B2 | 8/2006 | Evans et al. |

(Continued)

OTHER PUBLICATIONS

International Search Report dated Jul. 1, 2015 for International Patent Application No. PCT/US15/22687 (2 pgs.).

*Primary Examiner* — Gregory J Binda
*Assistant Examiner* — Zachary T Dragicevich
(74) *Attorney, Agent, or Firm* — Derek V. Forinash; Porter Hedges LLP

(57) ABSTRACT

A threaded connection comprising a pin member formed on an end of a first tubular member. The pin member includes an inner seal pin portion, a threaded pin portion, and an outer seal pin portion. The inner seal pin portion has an inner diameter that is greater than an inner diameter of the outer seal pin portion. A box member is formed on an end of a second tubular member. The box member includes an inner seal box portion, a threaded box portion, and an outer seal box portion. The inner seal box portion has an outer diameter that is greater than an outer diameter of the outer seal box portion. The inner seal pin portion sealingly engages the inner seal box portion and the outer seal pin portion sealingly engages the outer seal box portion when the threaded pin portion is engaged with the threaded box portion.

17 Claims, 2 Drawing Sheets

(56) References Cited

U.S. PATENT DOCUMENTS

| | | |
|---|---|---|
| 7,380,840 B2 | 6/2008 | Silvey, IV et al. |
| 7,581,766 B2 | 9/2009 | Verger et al. |
| 7,585,002 B2 | 9/2009 | Curley et al. |
| 7,588,270 B2 | 9/2009 | Durand et al. |
| 7,607,333 B2 | 10/2009 | Sivley et al. |
| 7,699,361 B2 | 4/2010 | Verger et al. |
| 7,798,536 B2 | 9/2010 | Hashem et al. |
| 7,931,311 B2 | 4/2011 | Dubedout et al. |
| 8,011,698 B2 | 9/2011 | Verger et al. |
| 8,042,842 B2 | 10/2011 | Dubedout et al. |
| 8,151,461 B2 | 4/2012 | Verger et al. |
| 8,177,262 B2 | 5/2012 | Silvey, IV et al. |
| 2003/0038476 A1* | 2/2003 | Galle, Jr. ............... F16L 15/003 285/334 X |
| 2004/0036286 A1* | 2/2004 | Della Pina ............ E21B 17/042 285/333 |
| 2004/0090068 A1* | 5/2004 | Evans ................... E21B 17/042 285/382 |
| 2005/0236834 A1 | 10/2005 | Curley et al. |
| 2007/0024053 A1* | 2/2007 | Sivley, IV ............ E21B 43/106 285/333 |
| 2007/0267199 A1* | 11/2007 | Evans ................... E21B 17/042 166/380 |
| 2010/0052319 A1 | 3/2010 | Benzie et al. |
| 2010/0132956 A1* | 6/2010 | LeBedz ................. E21B 43/106 166/378 |
| 2011/0133448 A1* | 6/2011 | Williams ............... F16L 15/009 285/333 |
| 2011/0133449 A1* | 6/2011 | Mazzaferro ........... E21B 17/042 285/333 |
| 2012/0152567 A1 | 6/2012 | Whiddon et al. |
| 2012/0325361 A1 | 12/2012 | Durivault et al. |
| 2014/0262213 A1* | 9/2014 | Delange ................ E21B 43/106 285/333 X |

* cited by examiner

EXPANDABLE METAL-TO-METAL SEAL CONNECTION

CROSS-REFERENCE TO RELATED APPLICATIONS

This application claims the benefit under 35 U.S.C. § 119(e) of U.S. Provisional Patent Application No. 61/975,363, filed Apr. 4, 2014, the disclosure of which is hereby incorporated herein by reference.

BACKGROUND

This disclosure relates generally to methods and apparatus for coupling wellbore tubulars with a threaded connection that can be radially expanded. More specifically, this disclosure relates to methods and apparatus for providing an expandable threaded connection with a metal-to-metal seal.

During hydrocarbon exploration, a wellbore typically traverses a number of zones within a subterranean formation. Wellbore casings are then formed in the wellbore by radially expanding and plastically deforming tubular members that are coupled to one another by threaded connections. Existing apparatus and methods for radially expanding and plastically deforming tubular members coupled to one another by threaded connections may not be suitable for all wellbore environments.

For example, many expandable threaded connections rely on elastomeric materials to provide a seal. Elastomeric seals may not be suitable for certain high temperature environments on when exposed to certain wellbore fluids. In conditions where elastomeric seals may not be desirable, it may be preferable to have a threaded connection that utilizes a metal-to-metal seal. A connection that utilizes a metal-to-metal seal forms a seal between two abutting surfaces of the threaded connections that contact with sufficient compressive force to form a seal between the surfaces.

Although there are many available examples of threaded connections that utilize metal-to-metal seals, those threaded connections that are also rated for radial expansion have not proven suitable for all applications. Thus, there is a continuing need in the art for methods and apparatus for providing an expandable threaded connection with a metal-to-metal seal.

BRIEF SUMMARY OF THE DISCLOSURE

A threaded connection comprising a pin member formed on an end of a first tubular member. The pin member includes an inner seal pin portion, a threaded pin portion, and an outer seal pin portion. The inner seal pin portion has an inner diameter that is greater than an inner diameter of the outer seal pin portion. A box member is formed on an end of a second tubular member. The box member includes an inner seal box portion, a threaded box portion, and an outer seal box portion. The inner seal box portion has an outer diameter that is greater than an outer diameter of the outer seal box portion. The inner seal pin portion sealingly engages the inner seal box portion and the outer seal pin portion sealingly engages the outer seal box portion when the threaded pin portion is engaged with the threaded box portion.

BRIEF DESCRIPTION OF THE DRAWINGS

For a more detailed description of the embodiments of the present disclosure, reference will now be made to the accompanying drawings, wherein.

DETAILED DESCRIPTION

Figure 1:
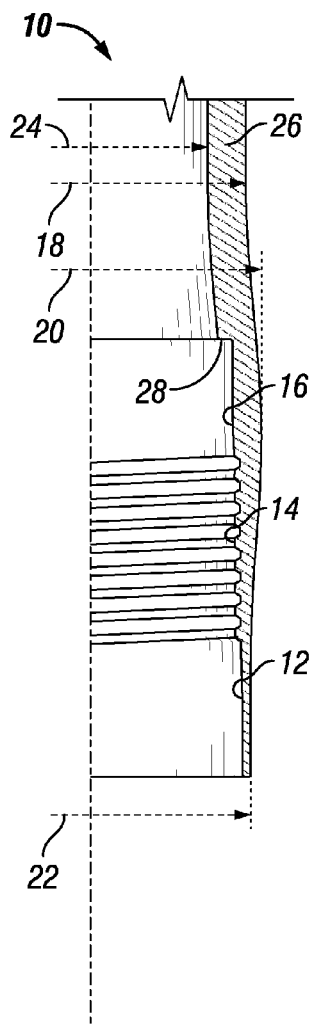
FIG. 1 is a partial sectional view of a box end connection.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 2:
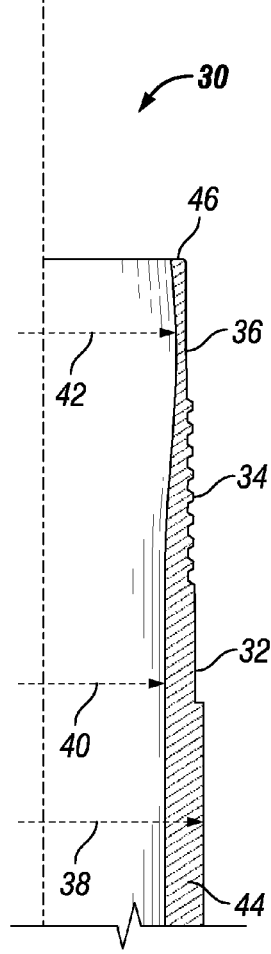
FIG. 2 is a partial sectional view of a pin end connection.
Figure 3:
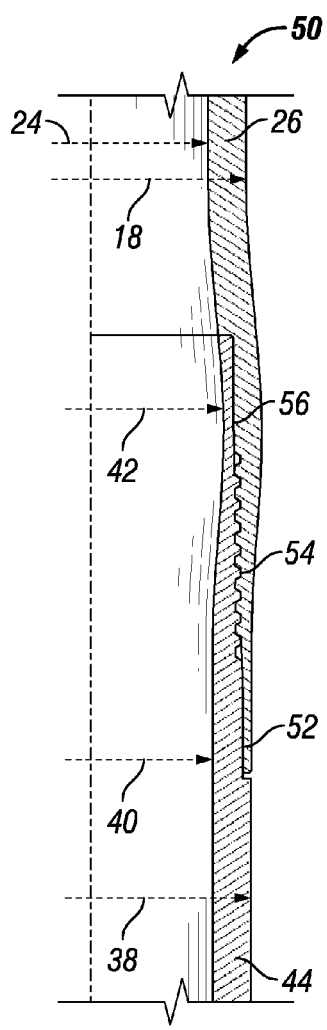
FIG. 3 is a partial sectional view of a threaded connection.
Figure 4:
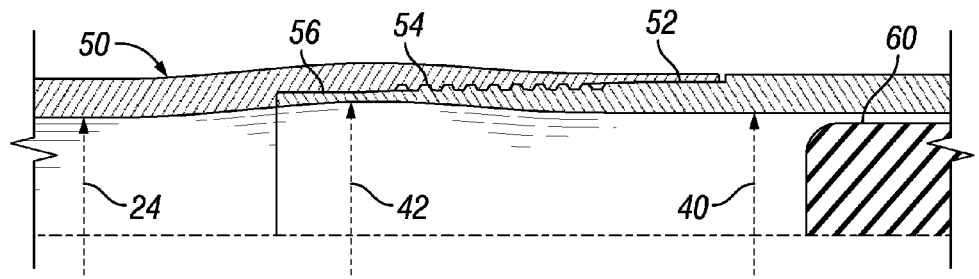
FIG. 4 is a partial sectional view of a threaded connection in an unexpanded state.

Referring initially to FIGS. 1-3, an expandable threaded connection 50 includes a box member 10 and a pin member 30. The pin member 30 is formed on an end of a first tubular member 44 having an outer diameter 38 and an inner diameter 40. The pin member 30 includes an outer seal pin portion 32, a threaded pin portion 34, and an inner seal pin portion 36. The inner seal pin portion 36 has an inner diameter 42 that is greater than the inner diameter 40 of the outer seal pin portion 32 and the first tubular 44. The threaded pin portion 34 extends between the outer seal pin portion 32 and the inner seal pin portion 36 and includes threads that may be straight threads or threads with a shallow taper.

The box member 10 is formed on an end of a second tubular member 26 having an outer diameter 18 and an inner diameter 24. The outer diameter 18 and inner diameter 24 of the second tubular member 26 may be substantially equal to the outer diameter 38 and the inner diameter 40 of the first tubular member 44. The box member 10 includes an outer seal box portion 12, a threaded box portion 14, and an inner seal box portion 16. The outer seal box portion 12 has an outer diameter 22 that may be nominally equal to the outer diameter 18 of the first tubular member 44. The inner seal box portion 16 is formed so that the outer diameter 20 of the inner seal box portion 16 is greater than the outer diameter 38 of the first tubular member 44. The threaded box portion 14 extends between the outer seal box portion 12 and the inner seal box portion 16 and includes threads that may be straight threads or threads with a shallow taper.

To form, or make-up, the expandable threaded connection 50, the pin member 30 is inserted into the box member 10 and rotated so that the threaded pin portion 34 engages the threaded box portion 14. When the expandable threaded connection 50 is made-up, as shown in FIG. 3, the threaded pin portion 34 is engaged with the threaded box portion 14 to form a threaded connection 54. The pin nose 46 is in contact with the internal shoulder 28 and metal-to-metal seals are formed at both an inner seal 56 and an outer seal 52. When made-up, the expandable threaded connection 50 has an inner diameter 42 at the inner seal 56 that is greater than the inner diameter 40 of the first tubular member 44 and the inner diameter 24 of the second tubular member 26.

FIGS. 4-7 illustrate the radial expansion of an expandable threaded connection 50 with an expansion device 60. The expansion device 60 has an expansion diameter 62 that is larger than the inner diameter 40 of the first tubular member 44 and the inner diameter 24 of the second tubular member 26. As the expansion device 60 moves axially through the first tubular member 44 and the second tubular member 26, the tubular members are radially expanded. The expansion device 60 may be moved through the tubular members by applying a pressure differential across the expansion device 60 or by mechanically pushing or pulling the expansion device 60. In certain embodiments, the expansion device 60 may be a substantially solid body and therefore have a fixed expansion diameter 62, while in other embodiments, the expansion device 60 may have an adjustable expansion diameter 62.

Figure 5:
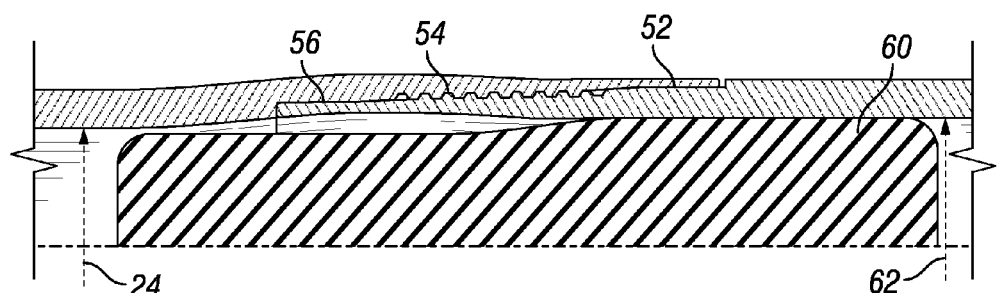
FIG. 5 is a partial sectional view of a threaded connection in a partially expanded state.
Figure 6:
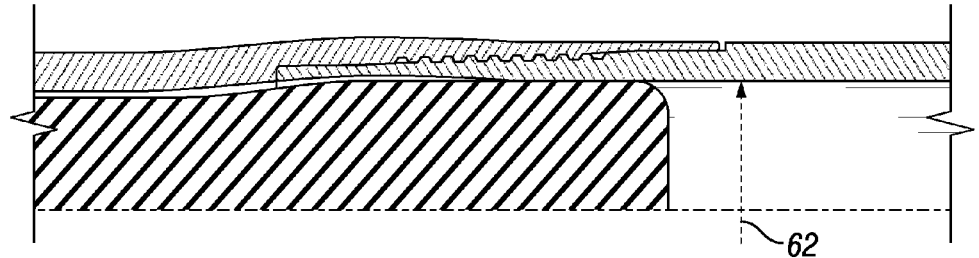
FIG. 6 is a partial sectional view of a threaded connection in a partially expanded state.
Figure 7:
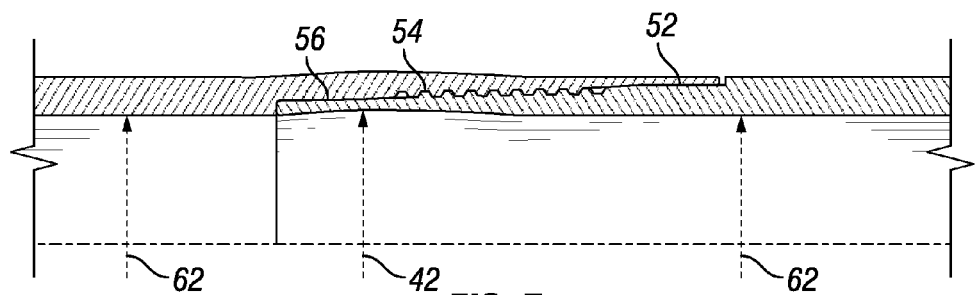
FIG. 7 is a partial sectional view of a threaded connection in an expanded state.

Referring now to FIG. 5, as the expansion device 60 moves into the expandable threaded connection 50, it first expands the outer seal 52. During expansion, contact forces between the outer seal pin portion 32 and the outer seal box portion 12 are maintained at a magnitude suitable to sustain a metal-to-metal seal both during and after expansion of the outer seal 52. Continued movement of the expansion device 60 expands the threaded connection 54.

As the expansion device 60 moves toward the inner seal 56, the inner diameter 40 increases, thus reducing the amount of radial expansion of the expandable threaded connection 50. In certain embodiments, the inner diameter 42 may be larger than the expansion diameter 62 of the expansion device 60 and the inner seal 56 will not be radially expanded. In other embodiments, the inner diameter 42 is less than the expansion diameter 62 and some radial expansion of the inner seal 56 will occur but at an expansion ratio (the ratio of expanded inner diameter to unexpanded inner diameter) less than the expansion ratio at the outer seal 52.

Because the inner seal 56 is subjected to little or no radial expansion, the pin nose 46 will tend to remain fully engaged with the internal shoulder 28 as opposed to deflecting inward as is common in expandable threaded connections. This allows the pre-load that is applied to the expandable threaded connection 50 to be maintained during expansion. Further, reducing, or eliminating, the radial expansion of the inner seal 56 allows for the contact pressure generated in the inner seal 56 to be more predictable, which increases the reliability of the inner seal 56. Further, the portion of the connection 10 having the outer diameter 20 is the largest outer diameter and undergoes little or no expansion. This large outer diameter section also provides standoff when running into the wellbore and provides protection for the thinner sections of the connection 30. In certain embodiments, the connection 10 may also be run with an external sleeve or external coating to further protect the connection 10 during running.

While the disclosure is susceptible to various modifications and alternative forms, specific embodiments thereof are shown by way of example in the drawings and description. It should be understood, however, that the drawings and detailed description thereto are not intended to limit the disclosure to the particular form disclosed, but on the contrary, the intention is to cover all modifications, equivalents and alternatives falling within the spirit and scope of the present disclosure.

What is claimed is:

1. A threaded connection comprising:
   an expansion device that is disposed within a first tubular member;
   a pin member formed on an end of the first tubular member, wherein the pin member includes an inner seal pin portion, a threaded pin portion, and an outer seal pin portion, wherein the inner seal pin portion has an inner diameter that is greater than an inner diameter of the outer seal pin portion; and
   a box member formed on an end of a second tubular member, wherein the box member includes an inner seal box portion, a threaded box portion, and an outer seal box portion, wherein the inner seal box portion has an outer diameter that is greater than an outer diameter of the outer seal box portion;
   wherein the expansion device is operable to move axially through and radially expand the first and second tubular members,
   wherein the inner seal pin portion sealingly engages the inner seal box portion when the threaded pin portion is engaged with the threaded box portion and forms an inner seal portion that isolates the threaded pin portion and the threaded box portion from exposure to fluids present inside the first and second tubular members, and
   wherein the outer seal pin portion sealingly engages the outer seal box portion when the threaded pin portion is engaged with the threaded box portion and forms an outer seal portion that isolates the threaded pin portion and the threaded box portion from exposure to fluids present outside the first and second tubular members.

2. The threaded connection of claim 1, wherein the box member further includes an internal shoulder that is in contact with a pin nose of the pin member.

3. The threaded connection of claim 1, wherein the expansion device has an expansion diameter that is greater than the inner diameter of the outer seal pin portion and less than the inner diameter of the inner seal pin portion.

4. The threaded connection of claim 1, wherein the expansion device has an expansion diameter that is greater than the inner diameter of the outer seal pin portion and greater than the inner diameter of the inner seal pin portion.

5. The threaded connection of claim 1, wherein the expansion device expands the outer seal pin portion at a greater expansion ratio than the inner seal pin portion.

6. An expandable threaded connection between first and second tubular members, comprising:
   an inner seal portion formed by an inner seal pin portion of a pin member sealingly engaged with an inner seal box portion of a box member;
   a threaded portion formed by a threaded pin portion of the pin member engaged with a threaded box portion of the box member;
   an outer seal portion formed by an outer seal pin portion of the pin member sealingly engaged with an outer seal box portion of the box member; and
   an expansion device that is disposed within the first tubular member;
   wherein an inner diameter of the inner seal pin portion is greater than an inner diameter of the outer seal pin portion, and wherein an outer diameter of the inner seal box portion is greater than an outer diameter of the outer seal box portion,
   wherein the inner seal portion isolates the threaded portion from exposure to fluids present inside the first and second tubular members when the inner seal pin portion is sealingly engaged with the inner seal box portion, and
   wherein the outer seal portion isolates the threaded portion from exposure to fluids present outside the first and second tubular members when the outer seal pin portion is sealingly engaged with the outer seal box portion.

7. The expandable threaded connection of claim 6, wherein the box member further includes an internal shoulder that is in contact with a pin nose of the pin member.

8. The expandable threaded connection of claim 6, wherein the expansion device has an expansion diameter that is greater than the inner diameter of the outer seal pin portion and less than the inner diameter of the inner seal pin portion.

9. The expandable threaded connection of claim 6, wherein the expansion device has an expansion diameter that is greater than the inner diameter of the outer seal pin portion and greater than the inner diameter of the inner seal pin portion.

10. The expandable threaded connection of claim 6, wherein the expansion device is operable to move axially through and radially expand the first and second tubular members.

11. The expandable threaded connection of claim 6, wherein the expansion device expands the outer seal pin portion at a greater expansion ratio than the inner seal pin portion.

12. A method comprising:
   forming a pin member on an end of a first tubular member, wherein the pin member includes an inner seal pin portion, a threaded pin portion, and an outer seal pin portion, wherein the inner seal pin portion has an inner diameter that is greater than an inner diameter of the outer seal pin portion;
   forming a box member on an end of a second tubular member, wherein the box member includes an inner seal box portion, a threaded box portion, and an outer seal box portion, wherein the inner seal box portion has an outer diameter that is greater than an outer diameter of the outer seal box portion;
   engaging the pin member with the box member so as to form an inner seal portion between the inner seal pin portion and the inner seal box portion, a threaded portion between the threaded pin portion and the threaded box portion, an outer seal portion between the outer seal pin portion and the outer seal box portion;
   isolating the threaded portion from exposure to fluids present inside the first and second tubular members with the inner seal portion;
   isolating the threaded portion from exposure to fluids present outside the first and second tubular members with the outer seal portion; and
   expanding the first and second tubular members by translating an expansion device axially therethrough, wherein the outer seal portion has an expansion ratio that is larger than an expansion ratio of the inner seal portion.

13. The method of claim 12, wherein the box member further includes an internal shoulder that is in contact with a pin nose of the pin member before and after expanding the first and second tubular members.

14. The method of claim 12, wherein the expansion device has an expansion diameter that is greater than the inner diameter of the outer seal pin portion and less than the inner diameter of the inner seal pin portion.

15. The method of claim 12, wherein the expansion device has an expansion diameter that is greater than the inner diameter of the outer seal pin portion and greater than the inner diameter of the inner seal pin portion.

16. The method of claim 12, wherein engaging the pin member and the box member generates a contact pressure between the inner seal pin portion and the inner seal box portion.

17. The method of claim 16, wherein the contact pressure is maintained during expansion of the first and second tubular members.

* * * * *